(12) United States Patent
Re

(10) Patent No.: US 11,585,381 B2
(45) Date of Patent: Feb. 21, 2023

(54) WHEEL HUB UNIT WITH IMPROVED DRAINAGE

(71) Applicant: AKTIEBOLAGET SKF, Gothenburg (SE)

(72) Inventor: Paolo A Re, Nichelino (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/477,356

(22) Filed: Sep. 16, 2021

(65) Prior Publication Data

US 2022/0090633 A1 Mar. 24, 2022

(30) Foreign Application Priority Data

Sep. 23, 2020 (IT) .................. 102020000022312

(51) Int. Cl.
*B60B 27/00* (2006.01)
*F16C 33/80* (2006.01)

(52) U.S. Cl.
CPC ........ *F16C 33/805* (2013.01); *B60B 27/0073* (2013.01); *B60B 2900/211* (2013.01); *F16C 2326/02* (2013.01)

(58) Field of Classification Search
CPC .... F16C 33/80; F16C 33/805; F16C 2326/02; B60B 27/0073; B60B 2900/211
See application file for complete search history.

(56) References Cited

U.S. PATENT DOCUMENTS

| 8,303,190 | B2 | 11/2012 | Shigeoka |
| 2012/0177315 | A1 | 11/2012 | Matsuki et al. |
| 2013/0292995 | A1* | 11/2013 | Bosco .................. F16C 33/805 |
| | | | 301/6.8 |
| 2016/0023512 | A1* | 1/2016 | Duch .................. B60B 27/0073 |
| | | | 301/110 |

FOREIGN PATENT DOCUMENTS

| EP | 2647891 | 10/2013 |
| EP | 2977226 | 1/2016 |
| JP | 2011226620 | 11/2011 |
| JP | 2012219971 | 11/2012 |

OTHER PUBLICATIONS

Machine Translation of JP 2012-219971 (Year: 2012).*
Search Report for corresponding Itallan Patent Application No. 102020000022312 dated May 26, 2021.

* cited by examiner

*Primary Examiner* — Alan B Waits
(74) *Attorney, Agent, or Firm* — Reed Smith LLP

(57) ABSTRACT

Wheel hub unit provided with a radially outer ring, stationary in use, a radially inner ring, rotating in use, at least one row of rolling elements, interposed between the radially outer ring and the radially inner ring, and a seal assembly, interposed between the radially outer ring and the radially inner ring, which defines cooperating with the radially outer ring or with the radially inner ring a shield of at least one labyrinth seal. The labyrinth seal does not have a circumferential symmetry but comprises an upper portion and a lower portion with respect to a symmetry axis (A) of the wheel hub unit and is provided with an angular interruption of the shield made on its lower portion corresponding to the lower side of the wheel hub unit so as to increase an outflow section thereof from the labyrinth seal itself which facilitates gravity drainage of contaminants present inside the seal assembly.

7 Claims, 3 Drawing Sheets

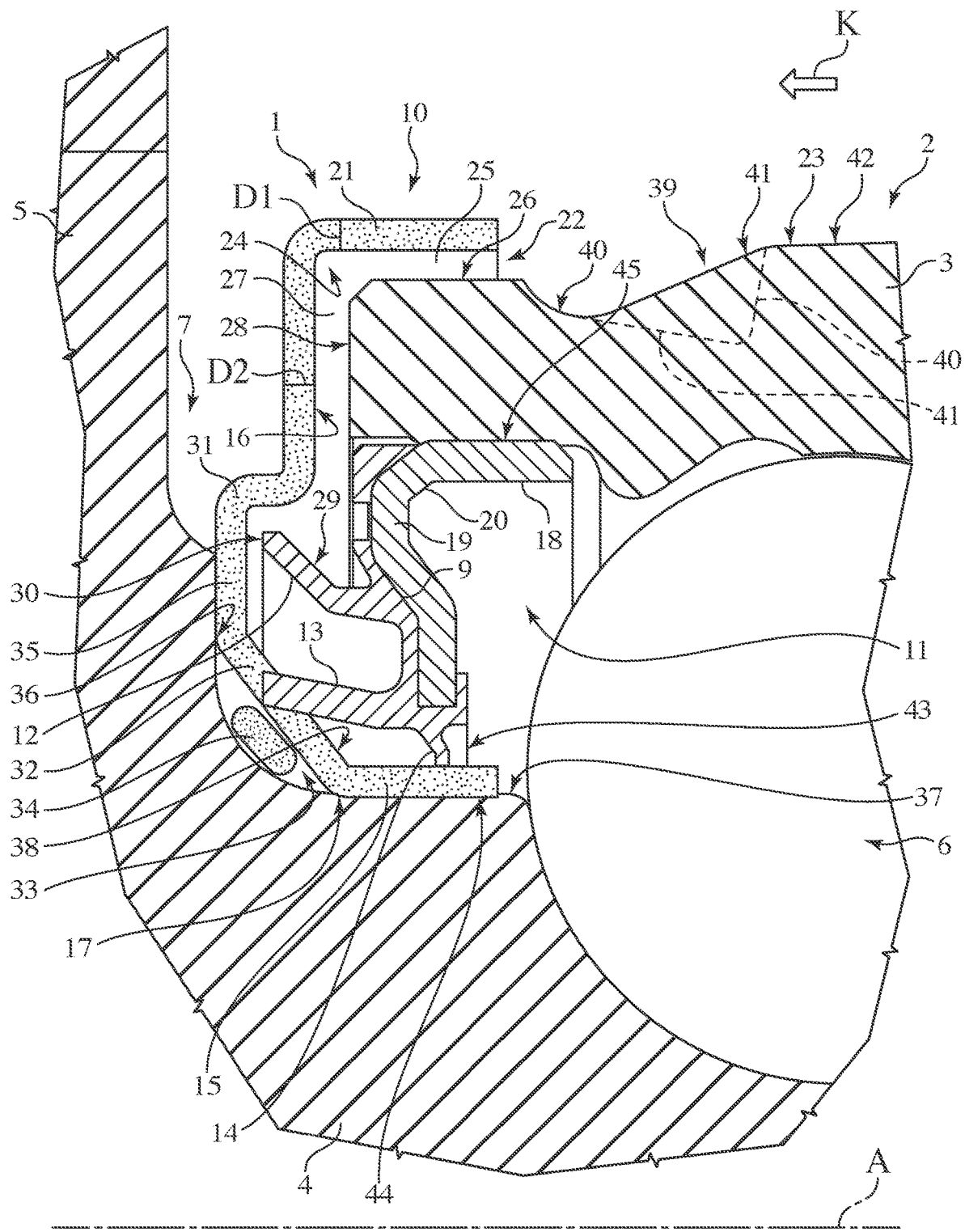
Fig. 1 - PRIOR ART

WHEEL HUB UNIT WITH IMPROVED DRAINAGE

CROSS REFERENCE TO RELATED APPLICATIONS

This application is based on and claims priority to Italian Patent Application No. 102020000022312 filed on Sep. 23, 2020, under 35 U.S.C. § 119, the disclosure of which is incorporated by reference herein.

TECHNICAL FIELD

The present disclosure relates to a vehicle wheel hub unit.

BACKGROUND

There exist rolling bearings in wheel hub units of vehicles. During usage, such rolling bearings are susceptible to ingress of external contaminants (for example, water, mud, and dust).

BRIEF DESCRIPTION OF THE DRAWINGS

The disclosure will now be described with reference to the attached drawings, which illustrate two non-limiting exemplary embodiments, in which:

FIG. 1 schematically shows in radial section a seal assembly according to the prior art, used in a wheel hub unit which is moreover known and therefore shown only partially for the sake of simplicity;

DETAILED DESCRIPTION

Figure 2A:
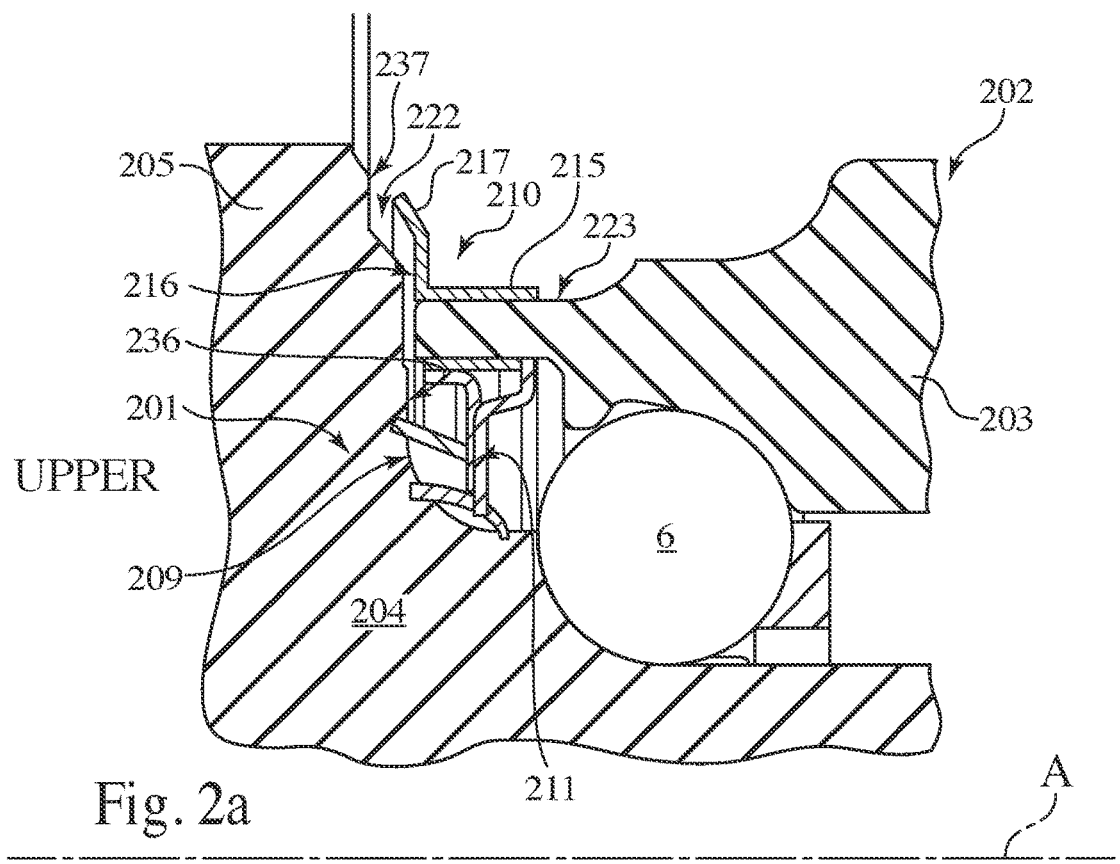
FIG. 2a schematically shows in radial section aspects of a first embodiment of the disclosure used in the wheel hub unit of FIG. 1.

The present disclosure relates to a vehicle wheel hub unit with improved drainage. In particular, the wheel hub unit has improved drainage at a seal assembly with which rolling bearings of the wheel hub unit are equipped.

In some embodiments of the present disclosure, sealing assemblies are intended to be fitted in the rolling bearings of wheel hub units at the flange supporting the wheel, referred to as "outer" or "outboard." Conventional sealing assemblies may encounter friction caused by the considerable interference from rubbing components of the bearing assembly. Moreover, such sealing assemblies, an example of which is shown in FIG. 1, present problems in terms of drainage of mud and contaminants. In working conditions, seals are exposed to the flow of mud, normally coming from above and from the sides. This seal assembly may prevent some mud from entering the first chamber of the labyrinth. However, since this sealing system has axial symmetry, drainage at the bottom is insufficient to allow the mud to exit the chamber. Therefore, mud becomes trapped, resulting in the seal assembly not functioning properly. Conventional attempts to improve drainage at the bottom of the wheel hub unit result in a seal assembly that fills up with mud more readily.

Embodiments of the present disclosure provide a wheel hub unit with a low-friction seal assembly with good drainage of contaminants without negatively affecting the containment capacity of the seal assembly itself.

With reference to FIG. 1, the reference sign 1 designates a prior art low-friction seal assembly, in particular designed to be fitted to a wheel hub unit 2 of a vehicle, the seal assembly 1 of which forms an integral part thereof in use.

A wheel hub unit 2 comprises an outer ring 3, stationary in use, an inner ring 4, rotating in use about an axis A, which is also the axis of symmetry of both rings 3 and 4, and at least one row of rolling elements 6 interposed between an outer ring 3 and an inner ring 4, which are mutually coaxial. The inner ring 4 has a flanged end 5 opposite to the outer ring 3 and intended to carry a vehicle wheel.

The seal assembly 1 may be inserted in an annular space 7 delimited between the rotating inner ring 4 and the stationary outer ring 3 of the wheel hub 2 and, more generally, between the rotating element 4 and the stationary element 3, which are mutually coaxial, of a rolling bearing of any type forming part of, or integrated in, the wheel hub unit 2.

The seal assembly 1 is interposed between the rings 3 and 4, inserted in the annular space 7, protecting the rolling elements 6 arranged between the stationary element 3 and the rotating element 4, and comprises: a first annular screen 10 made by cutting and stamping a stainless steel sheet, a second annular screen 11 also made by cutting and stamping a stainless steel sheet, arranged facing the first annular screen 10, and an annular gasket 9 made of one or more elastomeric materials, rigidly secured to the second annular screen 11 and having a plurality of sealing lips 12,13,14 that cooperate, as will be seen below, with the first annular screen 10 to make the annular space 7 fluid-tight towards the rolling elements 6.

The first annular screen 10 is provided with a first sleeve portion 15 or, more generally, a cylindrical portion 15, which in use is rigidly secured to the rotating element 4, and with a first flange portion 16, which projects radially from the first sleeve portion 15 in the direction away from the axis A, and therefore radially outwards, from an end 17 of the first sleeve portion 15 which faces the flanged end 5 of the rotating element 4.

The second annular screen 11 is provided with a second sleeve portion 18 or, more generally, cylindrical portion 18 which in use is rigidly secured to the stationary element 3, and with a second flange portion 19 projecting radially from the second sleeve portion 18 in the opposite direction to the flange portion 16 and facing the latter; the second flange portion 19 therefore extends radially inwards, towards the axis A and towards the first sleeve portion 15, from an axial end 20 of the second sleeve portion 18 which faces, in the non-limiting example shown, the first annular screen 10 and the flanged end 5 of the rotating element 4.

The sealing lips 12 and 13 of the annular gasket 9 project axially and radially from the second flange portion 19 towards the first flange portion 16, obliquely to the second flange portion 19, in the direction moving away from the axis A; furthermore, the first flange portion 16 terminates, at the opposite end to the first sleeve portion 15, in its radially outer peripheral annular segment 21, which in use projects radially and axially outside the annular space 7 so as to define with the stationary element 3 a first labyrinth seal 22.

In this case, the first flange portion 16 extends radially outside the annular space 7, projecting radially with respect to a radially outer lateral surface 23 of the ring 3.

Annular segment 21 of the first flange portion 16 is defined/formed by an edge, bent at a right angle, of the first flange portion 16 defining, in radial section, with the rest of the first flange portion 16, an L turned towards the axis A.

This edge 21 bent at a right angle delimits, in use, in radial section, together with the first flange portion 16 and the stationary element 3, an L-shaped channel 24 having, according to certain embodiments, a width which is substantially constant, but not necessarily the same, in radial and axial extension.

The channel 24 comprises a first branch 25 forming the labyrinth seal 22 and delimited between the annular segment or edge 21 bent at a right angle of the first flange portion 16 and a first cylindrical segment 26 of the lateral surface 23 of the outer ring 3, and a second branch 27 arranged at a right angle to the branch 25, delimited between the first flange portion 16 and a flat front surface 28 of the stationary element or outer ring 3 in the direction towards the rotating element or inner ring 4.

The L-shaped channel 24 emerges in an annular recess 29 the concavity of which faces the bent edge 21, and which is delimited between the second annular screen 11 and the sealing lip 12; the sealing lip 12 is the first radially outermost lip, i.e. the lip furthest from the axis A, of the annular gasket 9 and extends obliquely with respect to the first flange portion 16, in the direction away from the first sleeve portion 15 so as to cooperate with the first flange portion 16, with which it thus defines a second labyrinth seal.

The first flange portion 16 may have an intermediate right-angled bend 31 defining in radial section an L facing, on the opposite side, the L defined by the edge 21 bent at a right angle in some embodiments; the bend 31 is positioned at the mouth of the annular recess 29 in the L-shaped channel 24 of constant width and projects axially above the concavity of the annular recess 29, so as to form a dripstone which, in use, can guide any external contaminants that get past the first labyrinth seal 22 into said annular recess 29.

The first flange portion 16 terminates, at the end towards the first sleeve portion 15, in a second annular segment 32 arranged obliquely with respect to the first sleeve portion 15 and extending axially in the same direction as the first annular segment or edge 21 bent at a right angle, so as to delimit, on the opposite side to the first sleeve portion 15, a frustoconical cavity 33 which, in use, is filled with a water repellent substance 34.

A third annular segment 35 of the first flange portion 16 is arranged between the second annular segment 32 and the intermediate bend 31, which in some embodiments is at a right angle, and takes the form of a flat annular segment which, in use, can hit against an axial shoulder 36 of the rotating element 4 (in the example shown, defined by the flanged end 5) and can in turn serve as a mounting shoulder for pressing the first annular screen 10 on a radially outer cylindrical lateral surface 37 of the rotating element defined by the inner ring 4.

In practice, the first flange portion 16 is shaped so as to extend in the direction away from the first sleeve portion 15, both axially (optional as in the specific example shown) and radially, via the annular segment 32, it then continues, perpendicularly to the first sleeve portion 15, in the direction away from the latter, and only radially, via the annular segment 35, it extends back towards the first sleeve portion 15 by means of the bend 31, it then extends, only radially, in the direction away from the first sleeve portion 15, extending parallel to the annular segment 35 and it terminates in the edge bent at a right angle 21, which extends parallel to the first sleeve portion 15, in a position facing the first sleeve portion 15.

The sealing lip 13 is the second sealing lip, moving in the radial direction, of the annular gasket 9 and, according to some embodiments, it cooperates by rubbing, fluid-tightly, with the annular segment 32, which defines towards the sealing lip 13 and the second annular screen 11 a conical sealing surface 38 the conicity of which faces the second annular screen 11, i.e. it converges towards the axis A on the side of the second annular screen 11.

In FIG. 1 the sealing lip 13 is not shown to scale to facilitate comprehension, and partially in dotted line, in undeformed configuration.

The seal assembly 1 further comprises an annular groove 39 which is carried by the stationary element 3. The annular groove 39 is made in the lateral surface 23, generally of cylindrical shape, of the stationary element or outer ring 3, adjacent to the edge 21 bent at a right angle, and is delimited, in the axial direction, by a curved segment 40 along which the groove 39 gets deeper in the direction towards the rotating element 4 and the axis A, and, immediately thereafter, by a straight segment 41 defining a flat slope along which the depth of the groove 39 decreases to zero.

The annular groove 39 is shaped such that the concavity of the curved segment 40 faces the side from which, in use, possible external contaminants arrive, shown schematically by the arrow K; the concavity of the curved segment 40 may faces away from the rotating element 4, as shown by the continuous line in FIG. 1. However, the groove 39 may also have a different shape, in particular if the expected direction of arrival of the contaminants is different, as shown in dotted line in FIG. 1.

The third lip 14 of the annular gasket 9 may also be referred to as a grease seal lip, extending obliquely towards the first sleeve portion 15. In embodiments, the third lip 14 cooperates, without rubbing, with the first sleeve portion 15 so as to form a seal 43. The third 14 may however also be such that it rubs on the first sleeve portion 15.

The first and second sleeve portions 15 and 18 are delimited by respective cylindrical coupling surfaces 44 and 45, respectively, which, in use, are pressed against the rotating element 4 and the stationary element 3. The second sleeve portion 18 is coated in an elastomeric material. A suitable quantity of water repellent substance is applied to the surface 44, at the second annular segment 32 of the flange portion 16, to improve sealing.

Figure 2B:
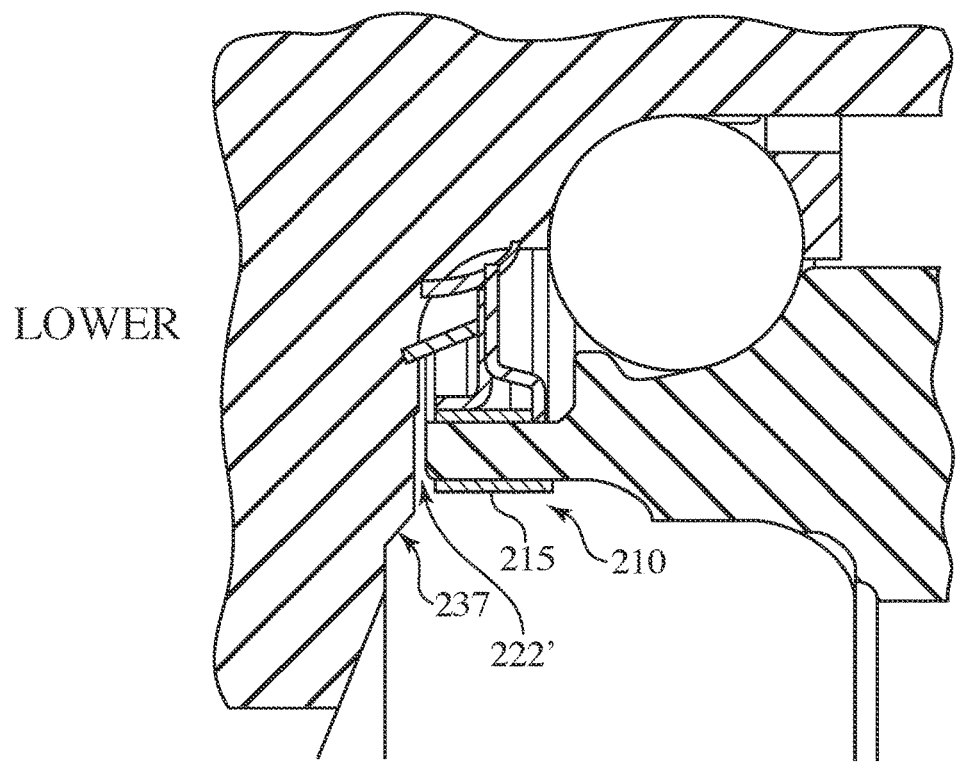
FIG. 2b schematically shows in radial section aspects of a first embodiment of the disclosure used in the wheel hub unit of FIG. 1.

With reference to FIG. 2, the reference sign 202 designates a wheel hub unit equipped with a seal assembly 201 applicable to embodiments of the present disclose. For convenience, FIG. 2 also comprises two details, one (UPPER) relating to the upper portion of the wheel hub unit and the other (LOWER) relating to the lower portion of said unit.

The wheel hub unit 202 comprises an outer ring 203, stationary in use, an inner ring 204, rotating in use about an axis A, which is also the axis of symmetry of both rings 203 and 204, and at least one row of rolling elements 6 interposed between the outer ring 203 and the inner ring 204, which are mutually coaxial; the ring 204 has a flanged end 205 opposite to the outer ring 203 and intended to carry a vehicle wheel.

The seal assembly 201 comprises a first screen 211 carrying an annular gasket 209 and a second screen 210 which effectively replaces the corresponding first annular screen 10 of the seal assembly 1 and creates a labyrinth seal 222.

In particular, the gasket 209 has one or more contacting lips which form a seal by cooperating with a radially inner annular surface 236 of the flanged end 205 of the inner ring 204.

The second screen 210 is a splash guard screen mounted on the radially outer ring 203 and in particular on its lateral surface 223.

The outer ring 203 is made in the same way as in the lower part of the first embodiment, except that, instead of being smooth only over a predetermined angular width, it is entirely smooth, being devoid of the shaped annular portion, i.e. the recess 39 of FIG. 1. The second screen 210 is stably attached in place of the material eliminated, over a width of 360° with respect to the axis of symmetry A of the wheel hub unit, to act as a splash guard. The second screen 210 is provided with a sleeve portion 215, which is stably fixed to the outer lateral surface of the stationary element 203, and with a flange portion 216 protruding towards the flanged end 205 of the inner ring 204. The flange portion 216 terminates, in its radially outer portion, in an oblique end 217 that cooperates with an annular surface 237 of the flanged end 205 so as to define the labyrinth seal 222.

In some embodiments, with reference to the lower portion (LOWER) of the wheel hub unit, the interruption of the shield on the lower side of the wheel hub unit is created by cutting out for a predetermined angular width the flange portion 216 of the second screen 210. In some embodiments, the second screen 210 in the lower portion of the wheel hub unit will comprise only the sleeve portion 215. Thus, the width of the labyrinth seal 222', in the lower part of the wheel hub unit 202, will be greater than the width of the labyrinth seal 222 in the upper part of the wheel hub unit, facilitating drainage by gravity of water, mud and contaminants in general.

Figure 3A:
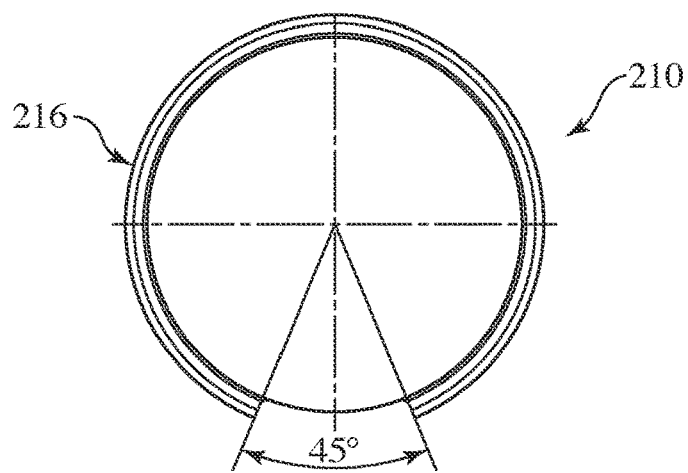
FIG. 3a schematically shows aspects of in front view three possible solutions of the embodiment of FIGS. 2a and 2b.
Figure 3B:
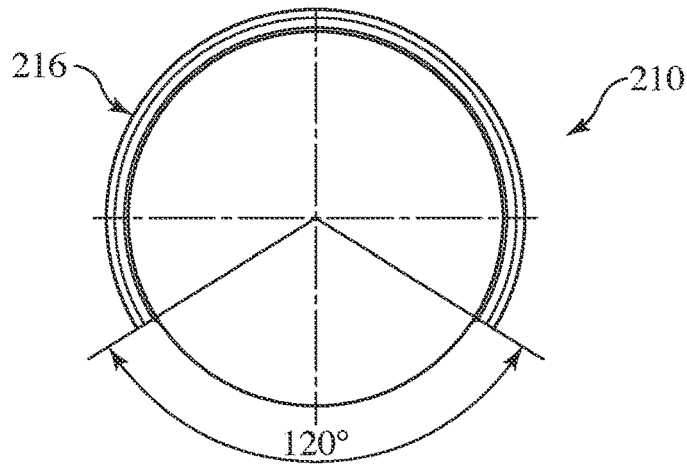
FIG. 3b schematically shows aspects of in front view three possible solutions of the embodiment of FIGS. 2a and 2b.
Figure 3C:
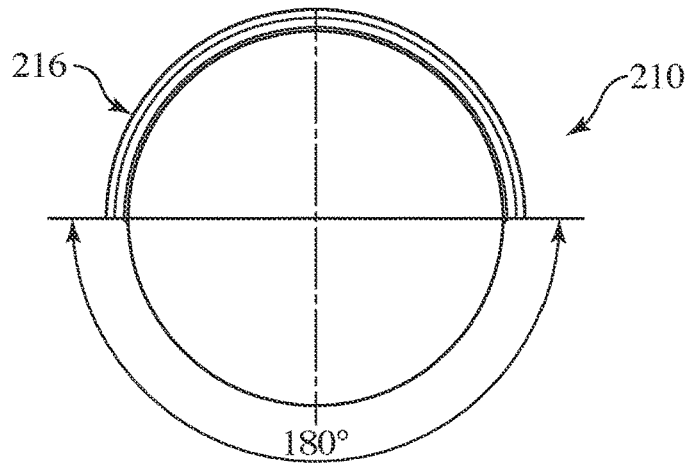
FIG. 3c schematically shows aspects of in front view three possible solutions of the embodiment of FIGS. 2a and 2b.

With reference to FIG. 3, the flange portion 216 of the second screen 210 may be cut to various angular widths depending on the specific operating conditions of the wheel hub unit 102. The comments made above are obviously also valid for this embodiment. Therefore, in operating conditions in which a low accumulation of contaminants is expected, and therefore a lower drainage capacity is needed, the angular width may be of the order of 45° (FIG. 3a). Conversely, in the event of more severe operating conditions, this angular width may be of the order of 120° (FIG. 3b) or even up to 180° (FIG. 3c) thus encompassing the entire lower portion of the wheel hub unit.

All of the embodiments described herein combine the conceptual solution of creating a greater opening of the labyrinth seal in an area, typically the lower part of the wheel hub unit, which is less exposed to the flow of mud.

This thus allows better drainage in an area that is less exposed to the ingress of contaminants yet advantageously allows the mud to flow out simply by gravity. The overall design combines the advantage of protection against the ingress of contaminants in the upper part and at the sides of the wheel hub unit, while at the same time improving drainage on the lower side of the bearing. This optimizes the performance of the wheel hub unit provided with low-friction labyrinth sealing assemblies, in all operating conditions.

The present disclosure described herein provides a low-friction seal assembly for a rolling bearing of wheel hub unit that overcomes the disadvantages of conventional designs described above.

According to embodiments of the present disclosure, a labyrinth seal assembly is provided between the outer ring of the wheel hub unit, stationary in use, and the flange portion of the screen rigidly secured to the inner ring, rotating in use, of the wheel hub unit, or, according to an entirely similar dual variant, a labyrinth seal assembly between the flanged end of the inner ring and a screen rigidly secured to the outer ring. The seal assembly is provided with an interruption of the shield on the lower side of the wheel hub unit, thereby facilitating drainage of mud by gravity. In embodiments, the labyrinth seal does not have a circumferential symmetry but comprises an upper portion and a lower portion with respect to a symmetry axis of the wheel hub unit and is provided with an angular interruption of the shield made on its lower portion corresponding to the lower side of the wheel hub unit so as to increase an outflow section thereof from the labyrinth seal itself which facilitates gravity drainage of contaminants present inside the seal assembly.

In some embodiments, the interruption of the shield may be made by creating a downward-facing opening in a screen rigidly secured to the outer ring. For example, a discharge opening for the outflow of water, mud and contaminants in general out of the bearing unit may be made in this component. The outflow may take place by gravity, and therefore this opening is positioned vertically at the bottom of the bearing, and may have various degrees of development about the axis.

It is understood that the disclosure is not limited to the embodiments described and illustrated, which are to be considered to be examples of implementation of the low-friction seal assembly, to which further modifications may be made in terms of shape and arrangement of parts, structural details and fitting.

The invention claimed is:

1. A wheel hub unit comprising:
 a radially outer ring configured to be stationary in use,
 a radially inner ring configured to rotate in use, the radially inner ring comprising a flanged end opposite to the outer ring,
 at least one row of rolling elements interposed between the radially outer ring and the radially inner ring, and
 a seal assembly interposed between the radially outer ring and the radially inner ring, the seal assembly defining at least one labyrinth seal and cooperating with one of the radially outer ring and the radially inner ring, the seal assembly comprising:
 a screen configured to be stationary in use and configured as a splash guard, the screen comprising a flange portion comprising a radially outer and oblique end configured to project towards and cooperate with an annular surface of the flanged end of the radially inner ring, the screen further comprising a unitary sleeve portion fixedly mounted on an outer lateral surface of the radially outer ring, the sleeve portion having a constant axial length extending annularly for 360° around a symmetry axis (A) of the wheel hub unit and disposed radially internally to and unitary with the flange portion of the screen,
 wherein the labyrinth seal does not have a circumferential symmetry,
 wherein the labyrinth seal comprises an upper portion and a lower portion with respect to the symmetry axis (A) of the wheel hub unit and is provided with an angular interruption of the screen made on its lower portion corresponding to the lower side of the wheel hub unit, the angular interruption is configured to increase an outflow section thereof from the labyrinth seal which is configured to facilitate gravity drainage of contaminants present inside the seal assembly, wherein the angular interruption of the screen on the lower portion of the labyrinth seal is defined by a cutout of the flange portion of the screen for a predetermined angular width, the predetermined angular width is constituted by the sleeve portion alone, and wherein the upper portion of the labyrinth seal is defined by the radially outer and oblique end and by the annular surface of the flanged end of the radially inner ring.

2. The wheel hub unit of claim 1, the sealing assembly comprising another screen configured to be stationary in use and carrying an annular gasket.

3. The wheel hub unit of claim 2, wherein the annular gasket has one or more contacting lips configured to form a seal cooperating with a radially inner annular surface of the flanged end of the radially inner ring.

4. The wheel hub unit of claim 1, wherein the angular width of the cutout of the flange portion of the screen is 45°.

5. The wheel hub unit of claim 1, wherein the angular width of the cutout of the flange portion of the screen is 120°.

6. The wheel hub unit of claim 1, wherein the angular width of the cutout of the flange portion of the screen is 180°.

7. A bearing assembly for a wheel hub unit, comprising:
a stationary ring configured to be stationary in use;
a rotatable ring configured to rotate in use, the rotatable ring comprising a flanged end opposite to the stationary ring,
at least one row of rolling elements interposed between the stationary ring and the rotatable ring; and
a seal assembly interposed between the stationary ring and the rotatable ring, the seal assembly defining at least one labyrinth seal between the stationary ring and the rotatable ring, the seal assembly comprising:
a first screen mounted on the stationary ring,
a gasket fixed to the first screen and comprising one or more contacting lips cooperating with a radially inner surface of the rotatable ring,
a second screen configured to be stationary in use and configured as a splash guard, the second screen comprising a flange portion comprising a radially outer and oblique end configured to project towards and cooperate with an annular surface of the flanged end of the rotatable ring, the second screen further comprising a unitary sleeve portion fixedly mounted on an outer lateral surface of the stationary ring, the sleeve portion having a constant axial length extending annularly for 360° around a symmetry axis (A) of the wheel hub unit and disposed radially internally to and unitary with the flange portion of the second screen,
wherein the labyrinth seal comprises an upper portion and a lower portion with respect to the symmetry axis (A) of the wheel hub unit and is provided with an angular interruption of the second screen made on its lower portion corresponding to the lower side of the wheel hub unit, the angular interruption configured to increase an outflow section thereof from the labyrinth seal which is configured to facilitate gravity drainage of contaminants present inside the seal assembly;
wherein the angular interruption of the second screen on the lower portion of the labyrinth seal is defined by a cutout of the flange portion of the second screen for a predetermined angular width, and the predetermined angular width is constituted by the sleeve portion alone.

\* \* \* \* \*